United States Patent Office 3,013,017
Patented Dec. 12, 1961

3,013,017
PROCESS FOR CHLORINATING COPPER PHTHALOCYANINE
John J. R. Luzzi, Freeport, N.Y., assignor to Interchemical Corporation, New York, N.Y., a corporation of Ohio
No Drawing. Filed Aug. 10, 1959, Ser. No. 832,457
2 Claims. (Cl. 260—314.5)

This invention relates to an improved process for producing chlorinated copper phthalocyanine. More particularly it relates to a process for making a chlorinated copper phthalocyanine having a high chlorine content which results in the composition having an intense green color much desired in pigments.

Chlorinated copper phthalocyanine is a well known green pigment which has been used for many years in printing inks, paints and resins.

Chlorinated copper phthalocyanine may be represented by the following formula:

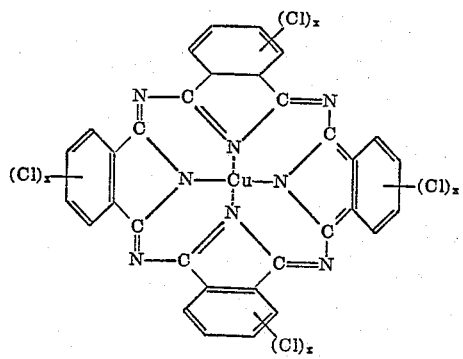

where $x$ is a number between 0 and 4. It is seen that a molecule may contain up to 16 chlorine atoms. It is well known that the greater the number or chlorine atoms present in the molecule, the higher the intensity of the green. While 16 chlorine atoms per molecule is the limit according to the above formula, methods which produce chlorinated copper phthalocyanine by the direct chlorination of copper phthalocyanine have not met with much success in incorporating more than 13 chlorine atoms per molecule.

In the past, many methods have been devised for the production of copper phthalocyanine compositions having a high chlorine content. Among these methods, the urea method has been successful to a considerable extent. This method involves reacting a nitrogen containing substance such as urea or biuret with a tri- or tetrahalophthalic acid or acid derivative such as tetrachlorophthalic anhydride and a source of copper such as cupric chloride in the presence of a catalyst which may be a halide or oxyhalide of an amphoteric metal. This process is described in U.S. Patent 2,549,842.

It has now been discovered that excellent yields of chlorinated copper phthalocyanine pigment having substantially 16 chlorine atoms per molecule can be produced by using an ammonium hexafluorotitanate catalyst in a urea type reaction.

According to this invention, a process is provided wherein ammonium hexafluorotitanate catalyzes the reaction of a nitrogen supplying substance such as urea or biuret, a copper source such as cupric chloride and a tri- or tetra-halophthalic acid or acid derivative such as tetrachlorophthalic anhydride.

The reaction is preferably conducted in solution, an inert solvent being used. While trichlorobenzene is used as the solvent, it will be understood that any solvent which will not react with the ingredients used or boil at the reaction temperature, may be used. The reaction may also be conducted as a melt reaction with no inert solvent present.

As a source of nitrogen, urea is preferred although biuret may also be used.

While cupric chloride is used as the source of copper in the illustrative example, it will be understood by those skilled in the art that the elemental copper as well as oxides and salts of copper may readily be used. These include cuprous and cupric oxide, cuprous chloride, cuprous cyanide and cupric sulfate among others.

With respect to the tri- or tetra-halophthalic acid or acid derivative, tetrachlorophthalic anhydride is preferred. However, it will be obvious that other tri- or tetra-halophthalic acids and anhydrides, imides, amides and imimides of such acids among others provide satisfactory substitutes.

The following examples will illustrate the practice of this invention.

EXAMPLE 1

*Preparation of catalyst*

20 grams of 94% titanium dioxide are mixed with 95 grams of ammonium fluoride. 35 ml. of water is then added and the mixture is heated over a steam bath and stirred into a homogeneous paste. The paste is then heated in a 165° C. oven for approximately 12 hours. The yield is 50 grams of ammonium hexafluorotitanate.

EXAMPLE 2

*Preparation of chlorinated copper phthalocyanine*

25 grams of urea, 18 grams of tetra-chlorophthalic anhydride, 5.75 grams of anhydrous cupric chloride in 236 grams of trichlorobenzene are heated to 87° C. 5.5 grams of the product of Example 1 is added and the mixture is heated slowly up to 210° C. over a period of 2 hours. The mixture is filtered and washed with a solvent comprising 100 cc. of hot trichlorobenzene and 300 cc. of hot Synasol.[1] The product is then reslurried with 300 cc. of hot water and washed with 400 cc. of hot Synasol. The reslurrying and washing is repeated 3 more times. The resulting product is then added to a solution of 75 cc. of water and 50 grams of concentrated sulfuric acid. The mixture is then maintained at 60°–65° C. for 2½ hours under constant stirring. The product is then washed with about 60 grams of a 40% sulfuric acid solution and then washed with water until free of acid.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A process for producing chlorinated copper phthalocyanine which comprises reacting by heating in an inert solvent, tetrachlorophthalic anhydride, urea, a copper ion supplying material and an ammonium hexafluorotitanate catalyst.

2. The process defined in claim 1 wherein said copper ion supplying material is cupric chloride.

---

[1] Synasol—trade name for a solvent marketed by Carbide and Carbon Chemicals Corporation comprising 100 volumes of denatured ethyl alcohol, 2 volumes of denaturing grade wood alcohol, 1 volume of ethyl acetate and 1 volume of aviation gasoline.

References Cited in the file of this patent
UNITED STATES PATENTS 2,549,842    Moser _____ Apr. 24, 1951
2,825,733    Kehe et al. _____ Mar. 4, 1958